United States Patent [19]
Aidlin et al.

[11] Patent Number: 4,873,410
[45] Date of Patent: Oct. 10, 1989

[54] PARALLEL GAP WELDER

[75] Inventors: Samuel S. Aidlin; Stephen H. Aidlin; Russell O. Bailey, all of Sarasota; Ed Myers, Bradenton, all of Fla.

[73] Assignee: Aidlin Automation Corp., Sarasota, Fla.

[21] Appl. No.: 138,352

[22] Filed: Dec. 28, 1987

[51] Int. Cl.$^4$ .............................................. B23K 11/16
[52] U.S. Cl. .................................. 219/56.1; 219/56.22
[58] Field of Search .................... 219/56.1, 56, 56.22, 219/86.25, 91.22, 78.01, 78.02

[56] References Cited

U.S. PATENT DOCUMENTS

| | | | |
|---|---|---|---|
| 4,041,271 | 8/1977 | Lorans | 219/86.25 |
| 4,465,913 | 8/1984 | Stokoe et al. | 219/86.25 |
| 4,504,725 | 3/1985 | Beneteau | 219/86.25 |

Primary Examiner—E. A. Goldberg
Assistant Examiner—Lincoln Donovan
Attorney, Agent, or Firm—Dominik, Stein, Saccocio, Reese, Colitz & Van Der Wall

[57] ABSTRACT

An improved parallel gap welder comprising spaced parallel electrodes, a handle to move the electrodes into contact with a workpiece and electrically energize the electrodes, and control means to independently very the pressure of each electrode on the workpiece.

5 Claims, 8 Drawing Sheets

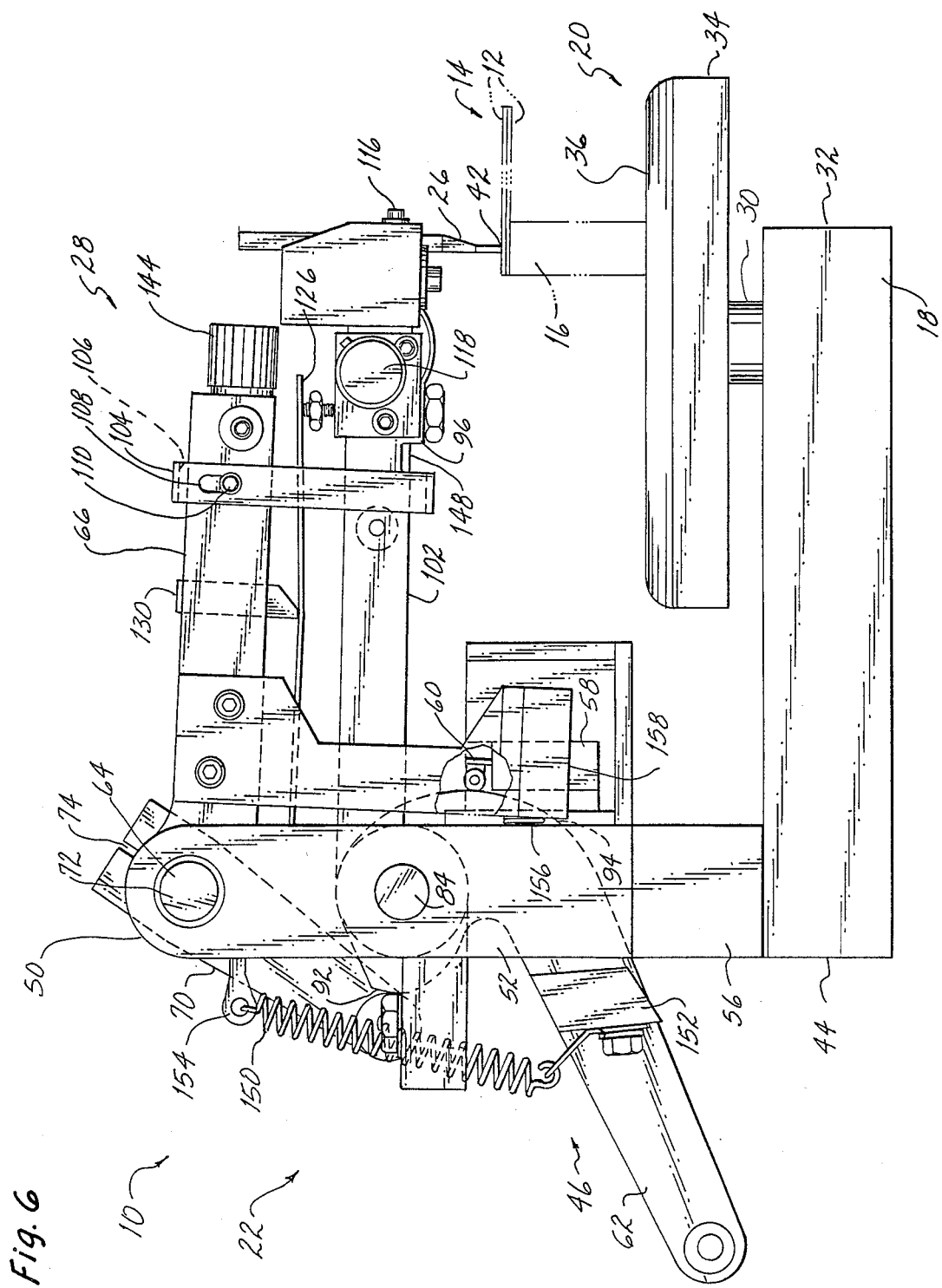

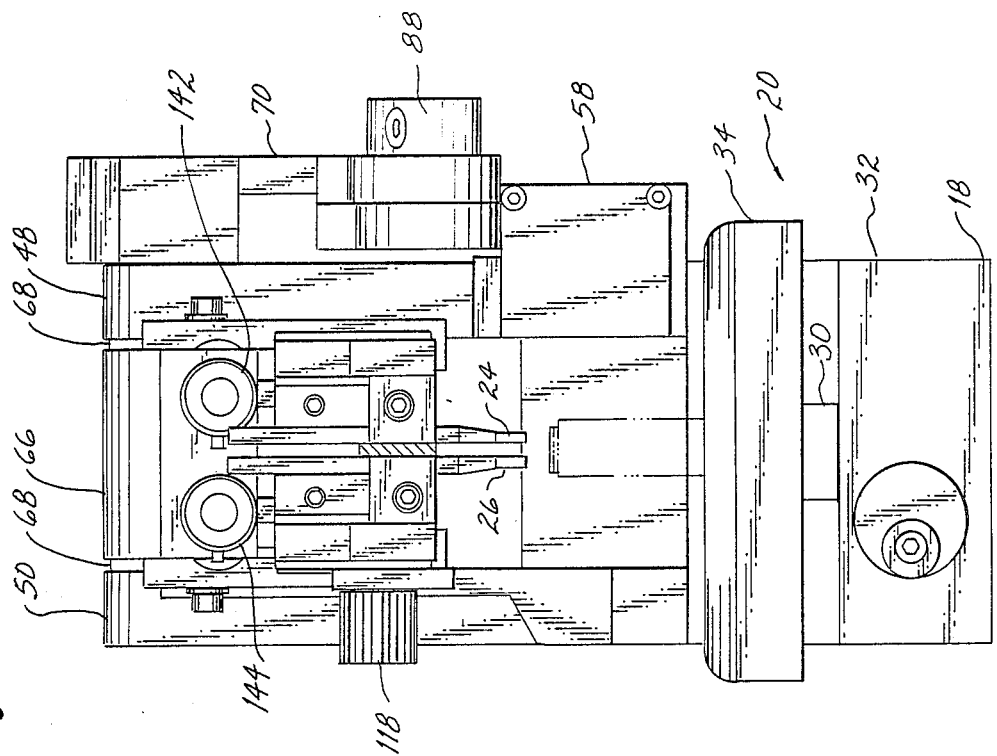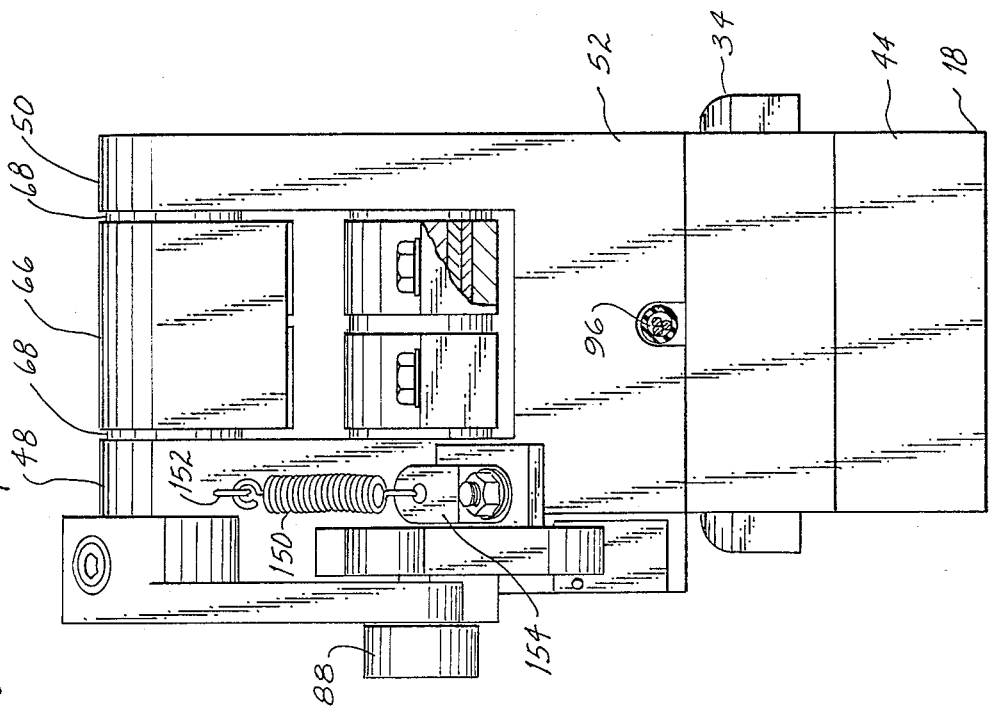

PARALLEL GAP WELDER

BACKGROUND OF THE INVENTION

1. Field of the Invention

This invention relates to an electrical parallel gap welder and, more particularly, to a parallel gap welder with improved control mechanisms for the independent application of a preselected force to each electrode by a single handle which also energizes the electrical circuitry.

2. Description of the Background Art

Welders are in common use today for electrically applying localized thermal energy to a workpiece as during the joining step of a fabrication process. One commonly used type of welder is the electrical parallel gap welder wherein spaced, parallel, independent electrodes are placed in contact with the electrically insulating workpiece components to be joined. The application of an electrical current from one electrode to the other through the workpiece components will effect the welding or joining function.

The quality of the weld on the workpiece is normally determined by the characteristics of the welding machine and the skill of the operator in properly holding the electrodes with respect to the workpiece. Independent, different, predetermined pressures on the irregularly shaped workpiece components by the tips of the two electrodes can result in a superior weld. Normally, however, such different, predetermined pressures are difficult to attain when they are left solely to the skill of an operator. Such applications of forces and the consistency of the welds thus vary among workpieces when various operators are welding. Additionally, activation of the welder by an operator, as well as the resulting welded workpiece, vary as a function of the force applied by the same operator from workpiece to workpiece.

To minimize these problems, designers and manufacturers of welding machines are continuously expending their efforts to devise new techniques for simplifying the operation of welders while improving the precision and consistency of the welds produced thereby. Various approaches are disclosed in the literature to simplify the use of welders while improving the resulting welds in both quality and consistency. Although many advances in the parallel gap welder art are noteworthy to one extent or another, none achieves the objectives of an efficient, accurate, consistent and inexpensive parallel gap welder designed to accommodate the specific needs of specific workpieces to be welded.

An optimum assembly would be something new which combines the benefits of the various prior art objectives without their shortcomings, i.e., a parallel gap welder which provides for the simplicity of operation, with minimum operator training, but which consistently yields accurately welded workpieces independent of both the particular operator and the particular shape of the workpiece.

As illustrated by the literature and the great number of commercial devices, efforts are continuously being made in an attempt to improve parallel gap welders to render them more efficient, accurate, consistent and economical. None of these previous efforts, however, provides the benefits attendant with the present invention. Additionally, prior parallel gap welders do not suggest, teach or disclose the inventive combination of component elements arranged and configured as disclosed and claimed herein. The present invention achieves its intended purposes, objectives and advantages over the prior art devices through a new, useful and unobvious combination of component elements, using a minimum number of functioning parts, at a reasonable cost to manufacture and employing only readily available materials.

Therefore, it is an object of this invention is to provide an apparatus which overcomes the inadequacies of the prior art devices and provides an improvement which is a significant contribution to the advancement of the parallel gap welder art.

Another object of this invention is to provide a parallel gap welder actuated by a single operator controlled handle which brings the electrodes into contact with the workpiece then creates an electrical current flow across the electrodes and through the workpiece to create a weld.

A further object of this invention is to apply accurate, repeatable pressures by the electrodes of a parallel gap welder to the workpiece during welding.

A further object of this invention is to adjust a parallel gap welder as a function of the workpiece to be welded, the adjustment being to each electrode independent of the other electrode.

The foregoing has outlined some of the more pertinent objects of the invention. These objects should be construed as merely illustrative of some of the more prominent features and applications of the intended invention. Many other beneficial results can be obtained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the spirit and scope of the invention as defined by the claims taken in conjunction with the accompanying drawings.

SUMMARY OF THE INVENTION

The invention is defined by the appended claims with the specific embodiment shown in the attached drawings. For the purpose of summarizing the invention, the invention, may be incorporated into an improved parallel gap welder which includes a base means having a surface to support a workpiece in a predetermined position; vertical support means extending from the rear end of the base means; a first shaft means journaled for rotation in the vertical support means; a first support means mounted on the first shaft means between the vertical support means; follower arm means secured to one end of the first shaft means; second shaft means secured between the vertical support means; handle means mounted for rotation on the second shaft means, the handle means being provided with rotatable cam means to rotate the follower arm means, first shaft means and first support means in response to movement of the handle means; second support means secured at their rear ends to the second shaft means; electrode means secured to the front ends of the second support means; bracket arm means secured to the edges of the first support means to provide shoulders for supporting the second support means and limit their downward motion; spring means secured at their rear ends to the first support means; means mounted for longitudinal movement with respect to the first support means with their lower edges adapted to contact predetermined portions of the spring means for varying the tensions to be applied to the workpiece by the electrode means; and electrical means responsive to motion of the handle means to energize the electrode means after they have contacted the workpiece. The welder further includes spring means to resist movement of the handle means and to return the moved handle means to its initial rest position. The welder further includes an elevation block to raise the workpiece and an elevation spacer to raise the vertical support means.

For the purposes of summarizing the invention, the invention may also be included in control means for a parallel gap welder of the type having a base; a plate to support a workpiece in a predetermined position with respect to the base; vertical supports extending upwardly from the rear end of the base; an upper shaft journaled for rotation in the vertical supports; a generally horizontal upper support mounted on the upper shaft for rotational movement therebetween; a follower arm secured to one end of the upper shaft for rotating the upper shaft and upper support; a lower shaft secured between the vertical supports beneath the upper shaft and a handle mounted for rotation on the lower shaft, the handle being provided with a cam surface to rotate the follower arm, upper shaft and upper support in response to movement of the handle. The control means includes a pair of laterally spaced horizontal lower supports secured at their rear ends to the lower shaft for independent rotation thereabout; electrodes secured to front ends of the lower supports; vertical bracket arms secured to the edges of the upper support and depending downwardly therefrom to present ledges for supporting the lower supports and for limiting the downward motion of each lower horizontal support; a pair of laterally spaced leaf springs secured at heir rear ends to the upper support and, having their front ends supported by the lower supports; adjustment means mounted for longitudinal movement with respect to the upper support between the front and rear ends of the leaf springs with their lower edges adapted to contact and predetermined portions of the leaf springs for varying the tensions to be applied by the electrodes to the workpiece; and electrical means responsive to continued motion of the handle to electrically energize the leaf springs after they have contacted the workpiece segments to be welded.

Lastly, for the purposes of summarizing the invention, the invention may be incorporated into an improved parallel gap welder. The welder comprises a base; a table top plate to support a workpiece in a predetermined position with respect to the base; and spaced vertical supports extending upwardly from the rear end of the base. An upper shaft is journaled for rotation in the vertical supports adjacent to their upper ends and a generally horizontal upper support is mounted on the upper shaft between the vertical supports for rotational movement therebetween. A follower arm is secured to one end of the upper shaft for rotating the upper shaft and upper support: and a lower shaft is secured between the vertical supports beneath the upper shaft. A handle is mounted for rotation on the lower shaft, the handle being provided with a rotatable cam surface to rotate the follower arm, upper shaft and upper support in response to movement of the handle. A pair of laterally spaced horizontal lower supports are secured at their rear ends to the lower shaft for independent rotation thereabout with electrodes secured to front ends of the lower support. Vertical bracket arms are secured to the edges of the upper support and depending downwardly therefrom to present shoulders for supporting the lower supports and limit to the downward motion of each lower horizontal support. A pair of laterally spaced leaf springs are secured at their rear ends to the upper support and, having their front ends supported on adjustment nuts upstanding from the lower supports with adjustment fingers mounted for longitudinal movement with respect to the upper support between the front and rear ends of the leaf springs with their lower edges adapted to contact predetermined portions of the leaf springs for varying the tensions to be applied by the electrodes to the workpiece. Lastly, electrical means responsive to continued motion of the handle are used to energize the leaf springs after they have contacted the workpiece segments to be welded.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed herein may be readily utilized as a basis for modifying or designing the other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 6 is a left side elevational view of the parallel gap welder shown in FIGS. 1, 4 and 5 but showing the handle in both the upper and lower positions.

FIG. 7 is a rear elevational view of the parallel gap welder shown in the prior Figures.

FIG. 8 is a front elevational view of the parallel gap welder shown in the prior Figures.

Similar reference characters refers to similar parts throughout the several drawings.

DETAILED DESCRIPTION OF THE PREFERRED EMBODIMENT

Figure 1:
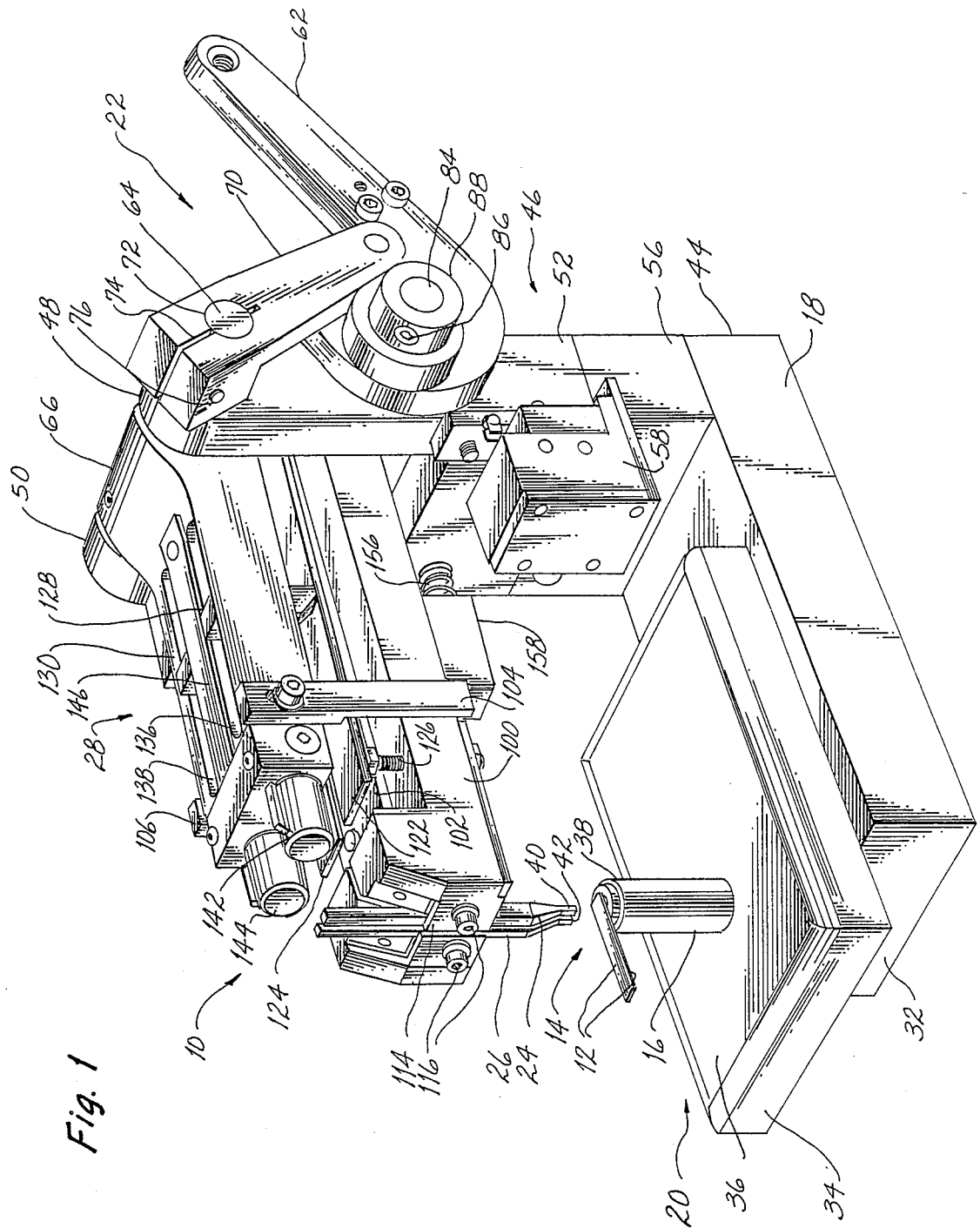
FIG. 1 is a perspective illustration taken from the front right side of the parallel gap welder constructed in accordance with the preferred embodiment of the present invention.
Figure 2:
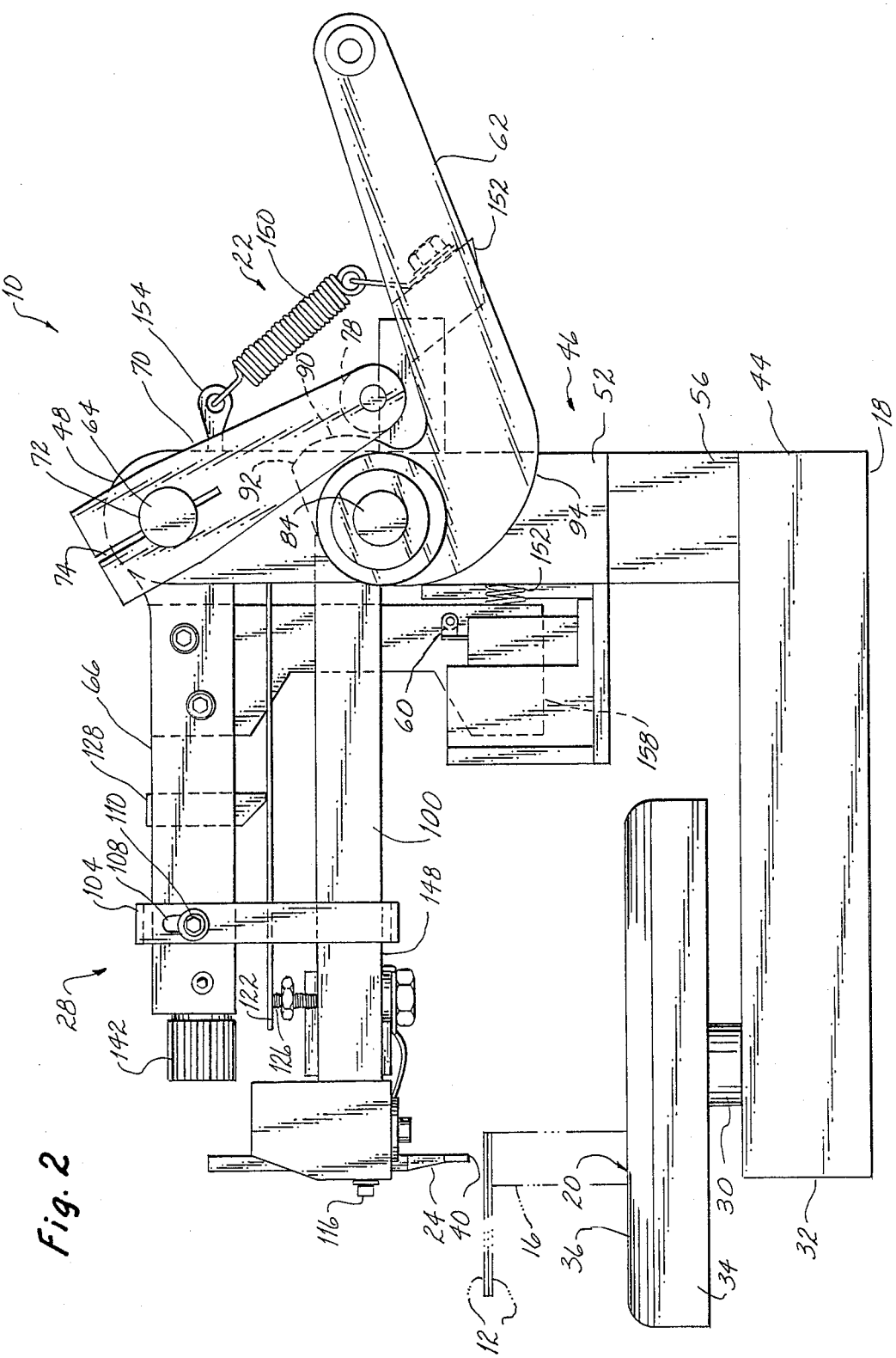
FIG. 2 is a right side elevational view of the parallel gap welder shown in FIG. 1 with the handle in the raised or inactive position prior to activation.
Figure 3:
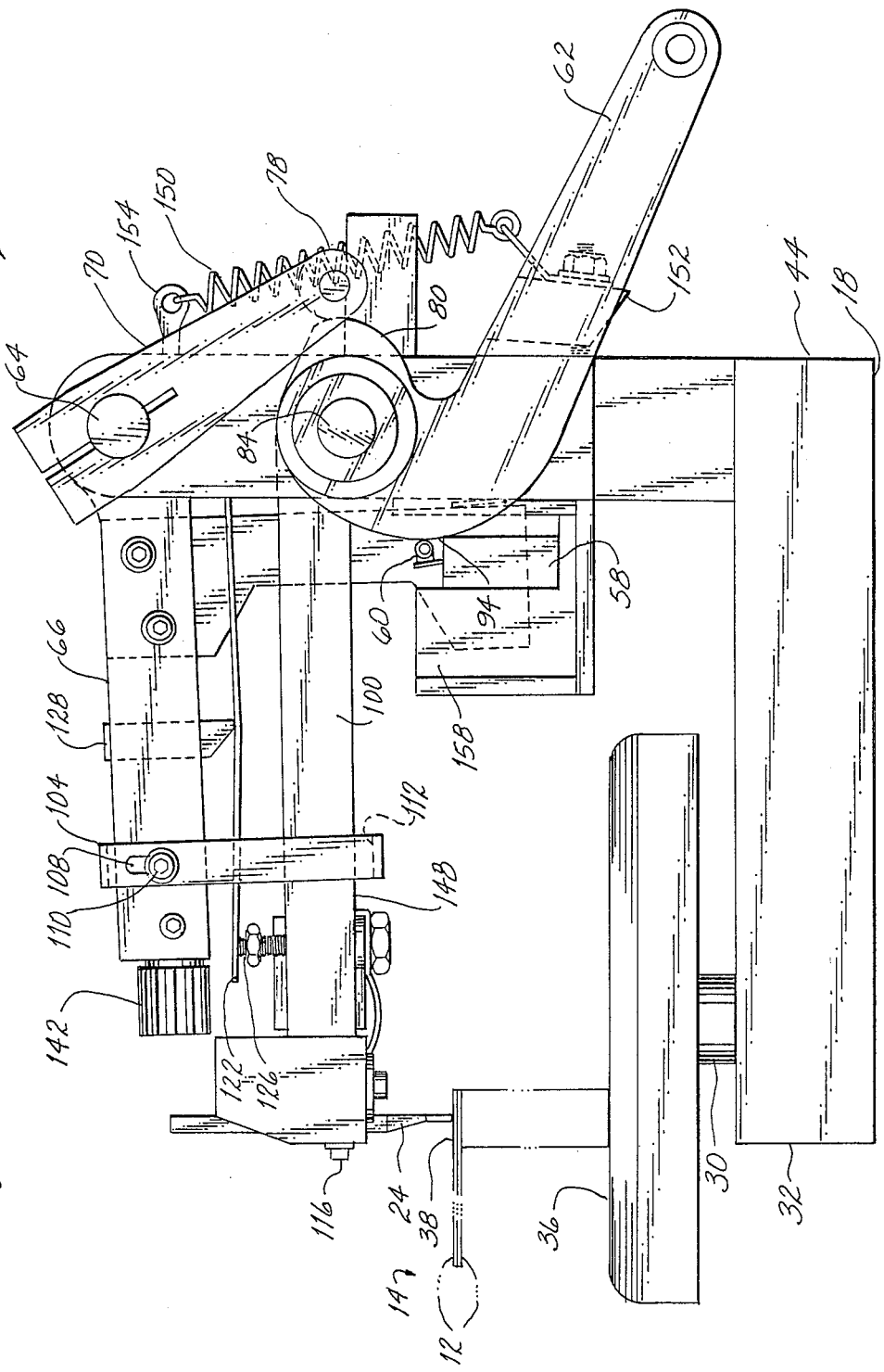
FIG. 3 is a right side elevational view of the parallel gap welder shown in FIGS. 1 and 2 but with the handle in the lower or activated position.
Figure 4:
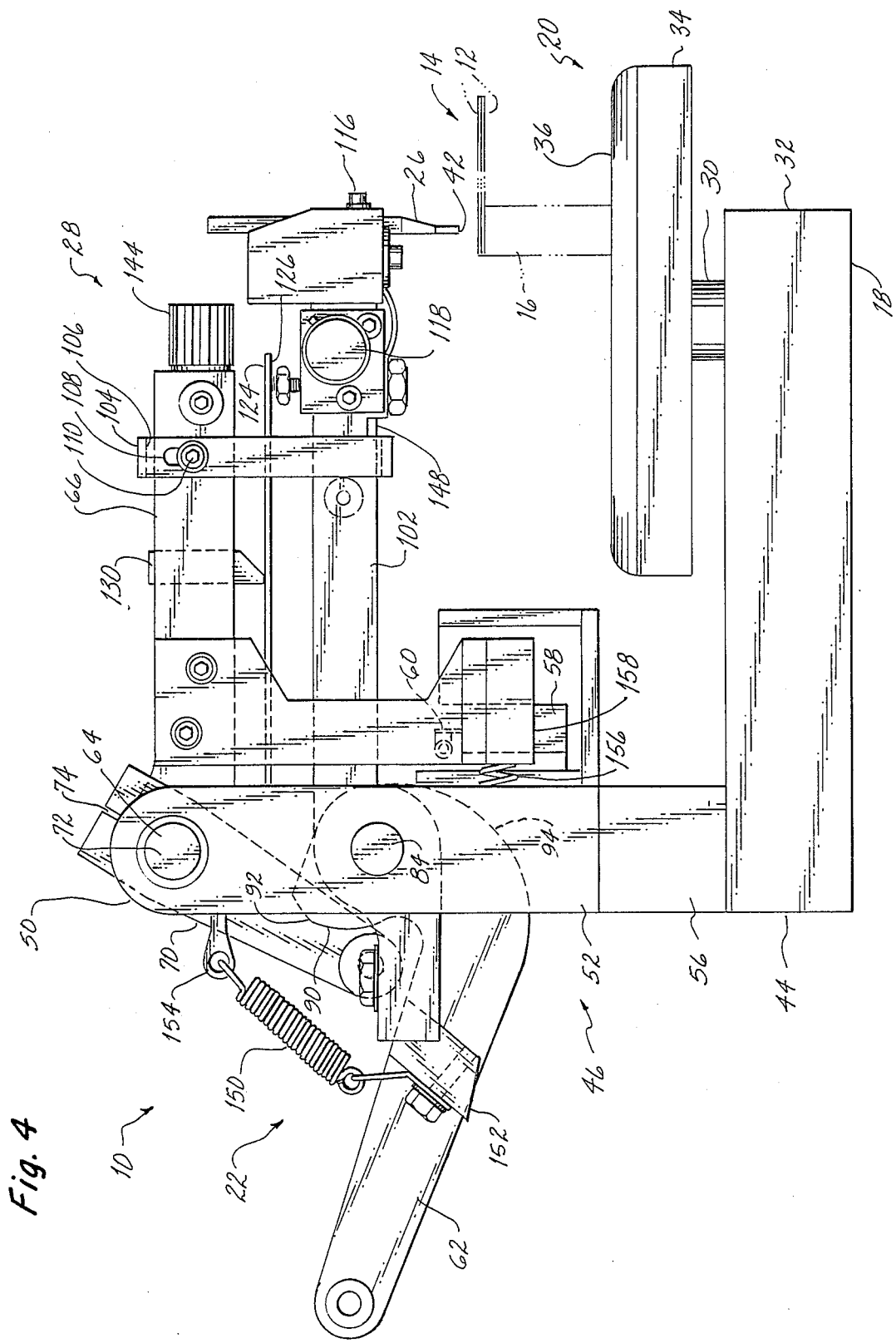
FIG. 4 is a left side elevational view of the parallel gap welder shown in FIG. 1 with the handle in the raised or inactive position prior to activation.
Figure 5:
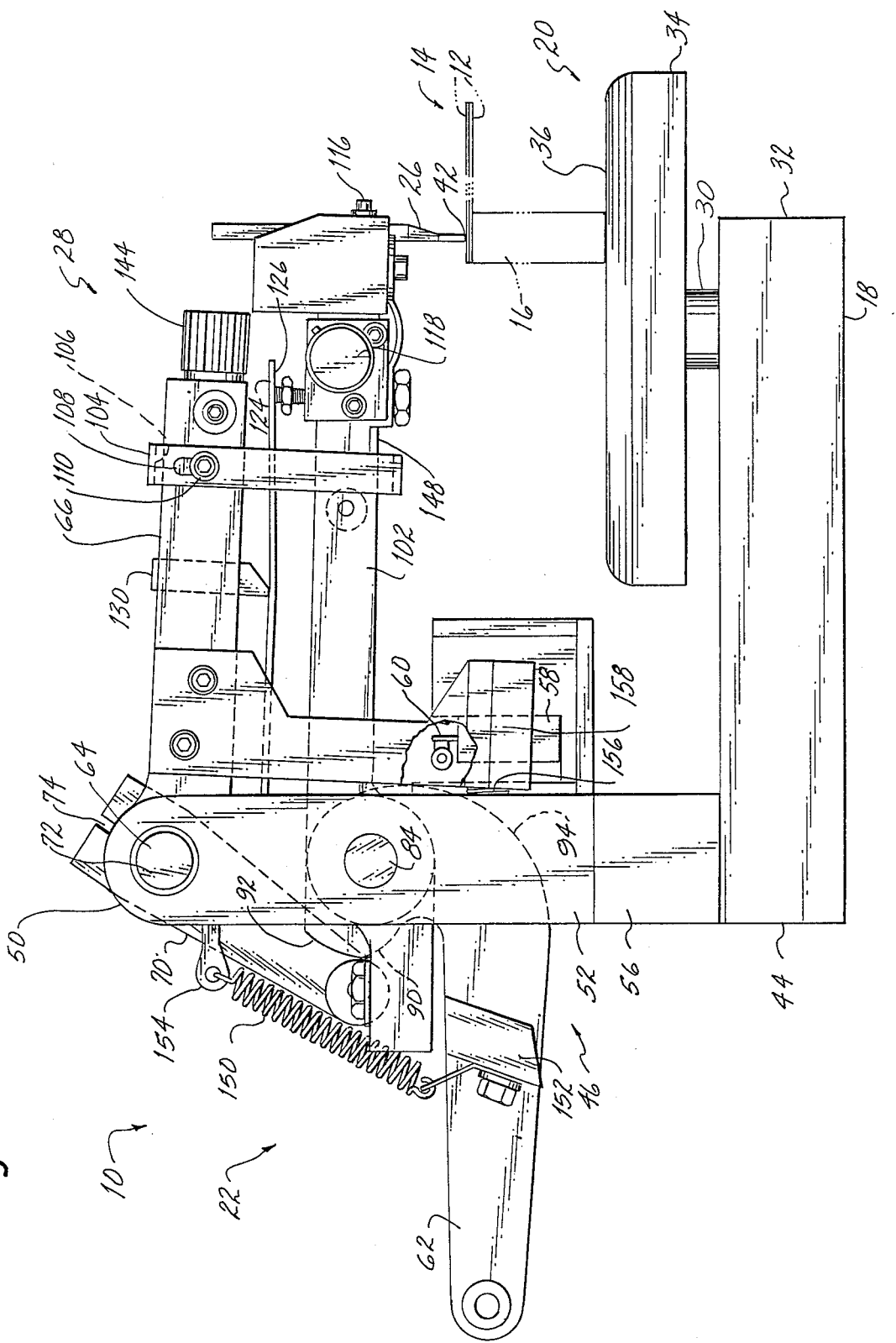
FIG. 5 is a left side elevational view of the parallel gap welder shown in FIGS. 1 and 4 but with the handle in the lower or activated position.

Shown in FIGS. 1 through 9 are various views of the primary embodiment of the parallel gap welder or machine 10 constructed in accordance with the principles of the present invention. It is configured to weld together component elements 12 of a workpiece 14 supported on an electrically conductive elevation block 16.

The parallel gap welder 10 of the present invention includes a base 18 positionable on a work table, not shown. Upstanding from the base 18 are the support assembly 20 for the workpiece 14, the control assembly 22, and, for movement therewith, the electrodes 24 and 26 supported on the control assembly 22. A tension control subassembly 28 is part of the control assembly 22.

Upstanding from the front end of the base 32 is a table top plate 34 with a flat, horizontal surface 36 for supporting the workpiece 14. In the configuration of the machine herein depicted, an elevation block 16 having an upper flat surface 38 positionable in close proximity to the tips 40 and 42 of the electrodes 24 and 26. Post 30 supports plate 34 on base 18.

Upstanding from the rear end of the base 44 is a vertical support 46 with a pair of vertical support arms 48 and 50 extending upwardly from opposite edges of the lower portion 52 of the support. The vertical support arms 48 and 50 are thus extensions of the common lower support portion 52. In the configuration of FIGS. 1 through 9 a vertical elevation spacer 56 is located and suitably secured between the top surface of the base 18 and the lower support portion 52 to allow the parallel gap welder 10 to be utilized in association with the elevation block 16. The elevation block 16 and vertical elevation spacer 56 could readily be omitted if the particular workpiece so allowed.

Secured adjacent to the lower edge of the right vertical support arm 48 is a limit switch 58 with a finger 60 movable in response to the movement of a handle 62 for controlling the energizing and deenergizing of the electrodes 24 and 26 in a manner to be described hereinafter. The upper ends of the vertical support arms 48 and 50 are provided with apertures for rotatably receiving and supporting a horizontal, cylindrical, first upper shaft 64 for oscillatory rotation about its horizontal axis. Secured by set screws to the upper shaft 64 between the vertical support arms 48 and 50 is a generally horizontal first upper support 66. An aperture through the rear end of the upper support receives the upper shaft with set screws effecting their coupling for concurrent movement. Washers 68 on the upper shaft 64 space the upper support from the vertical support arms 48 and 50. This securement allows for oscillatory, rotational movement of the upper support in response to the oscillatory, rotational movement of the upper shaft. One end of the upper shaft 64, that on the left side, is flush with the exterior edge of the left vertical support arm 50. The right side of the upper shaft 64 extends through the right vertical support arm 48 a distance sufficient to receive a spacer and a follower arm 70. The follower arm 70 has an aperture 72 at its radially interior upper end with a radial slot 74 extending upwardly therefrom. A set screw 76 adjustably secures and positions the follower arm 70 with respect to the upper shaft 64 for rotation therewith. The exterior or lower end of the follower arm 70 is provided with a roller 78 which follows the movement of the cam surface 80 of the handle 62. In this manner, movement of the roller 78 at the lower end of the follower arm 70 in an arcuate motion as dictated by the handle movement will appropriately oscillate the follower arm 70, upper shaft 64 and upper horizontal support 66 about the axis of the upper shaft.

Appropriate motion is provided to the follower arm 70, upper shaft 64, upper horizontal support 66 and, consequently, the electrodes 24 and 26 by movement of the handle 62 and its associated cam surface 80. The handle 62 is supported in position by a horizontal second lower shaft 84 secured for oscillatory, rotational movement in spaced apertures at an intermediate height in the vertical support arms 48 and 50. The lower shaft 84 is located parallel with, but beneath, the upper shaft 64. Like the upper shaft 64, the lower shaft 84 has its left end secured flush with the exterior surface of the left vertical support arm 50. Its right end, however, extends through the right vertical support arm 48 a distance sufficient for receiving an aperture in the lower or interior end of the handle 62. A set screw 86 through a keeper 88 fixedly secures the handle 62 to the lower shaft 84 for oscillatory, rotational movement therewith. The handle 62 has an upper or exterior end for being gripped and manipulated as by the operator or by automatic mechanisms during use of the welder machine 10.

The interior or lower end of the handle 62 is provided with a cam having a precisely shaped cam surface 80. The majority of the operational extent of the cam surface is an initial, major, first curved portion 90 adapted to contact and pivot the follower arm 70 at roller 78 in a direction to lower the horizontal support 66 and electrodes 24 and 26 as the handle 62 is moved from its upper to its lower position, the movement being effected through the rolling and radial displacement of the roller 78 at the lower end of the follower arm in response to movement of the first curved portion 90 of the cam surface 80. A subsequent minor or second curved portion 92 of the cam surface 80 is contoured to provide a surface at a fixed distance from the axis of rotation of the lower shaft 84. This second curved portion of the cam is concentric with the lower shaft 84, its axis and the axis of rotation of the handle 62.

Movement of the handle 62 with the roller 78 in contact with the second curved portion 92 will not cause any radial displacement of the follower arm 70. Continued motion of the handle 62 downwardly, therefore, effects no continued movement of the follower arm 70, upper shaft 64, horizontal support 66 or electrodes 24 and 26. Rather, these rotatable elements will remain in a fixed position with the electrodes down while such further movement of the handle 62 will simply effect contact and movement of the actuating finger 60 by a third portion 94 of the cam of the limit switch 58. Note FIG. 6. This in turn provides an activating signal to the power supply 96 to electrically energize the electrodes for effecting the welding action on the workpiece 14. Such electrical energization, however, only occurs after the electrodes have been moved into proper position with respect to the workpiece. Release of the handle 62 removes the pressure from the switch finger 60 to terminate the electrical energization and also returns the electrodes 24 and 26 to their original ready or raised position.

Also located on the lower shaft 84 between the vertical support arms 48 and 50 are a pair of similarly shaped generally horizontal second lower supports 100 and 102. The lower supports are provided with apertures at their rear ends for receiving the lower shaft 84 but are not secured for rotation therewith. Rather, they are adapted to rotate independently about the axis of the lower shaft, independent of the rotational position of the handle and lower shaft upon which they are mounted.

Downward movement of the horizontal lower supports 100 and 102 is restrained by a pair of vertical bracket arms 104 and 106 secured to the side edges of the upper support. Elongated slots 108 are formed in the upper ends of the vertical bracket arms 104 and 106 to adjustably secure such arms in position by set screws 110 for the purpose of fine adjustment. The lower edges of the vertical bracket arms are provided with inwardly directed shoulders or ledges 112 which limit the downward movement of the lower supports. The lower supports, being formed of two similarly shaped parallel elements, allow for the independent rotational, oscillatory movement of the lower supports about the lower shaft and, consequently, the independent movement, adjustment and force application of the two electrodes as will be explained hereinafter.

The electrodes 24 and 26 of the welder are similarly shaped, electrically conductive metallic members spaced parallel with respect to each other which project downwardly at the exterior or front ends of the horizontal lower supports. They are mounted in plates 114 through set screws 116 which allow for their independent movement and adjustment one from another. The electrodes, including their lower tips, are spaced a distance to define a small air gap, adjustable in extent, across which an electrical current may pass to form an arc and cause the heat necessary to join, through electrically welding, the contacted workpiece components. Electrical wires, of the conventional type couple the electrodes to the power supply and the power supply to the switch which, in turn, is activated and inactivated by the movement of the finger 60 being contacted and reversed by the handle 62. An adjustment knob 118 extends from the power supply for operator control of the amount of current and degree of heat which might be needed as a function of the workpiece being welded.

In addition to these motion imparting mechanisms as described above, a variable pressure may be provided by additional mechanisms in the tension control subassembly 28 of the control assembly 22. The tension control subassembly 28 includes a pair of elongated leaf springs 122 and 124, one associated with each horizontal lower support 100 and 102 and each electrode 24 and 26. Each leaf spring is secured at its rear end to the horizontal, upper support 66 by bolts for retention in a generally horizontal position between the upper and lower supports. The front ends of the leaf springs rest on the ends of bolts 126 threadably secured to the lower supports for fine adjustment purposes.

Figure 9:
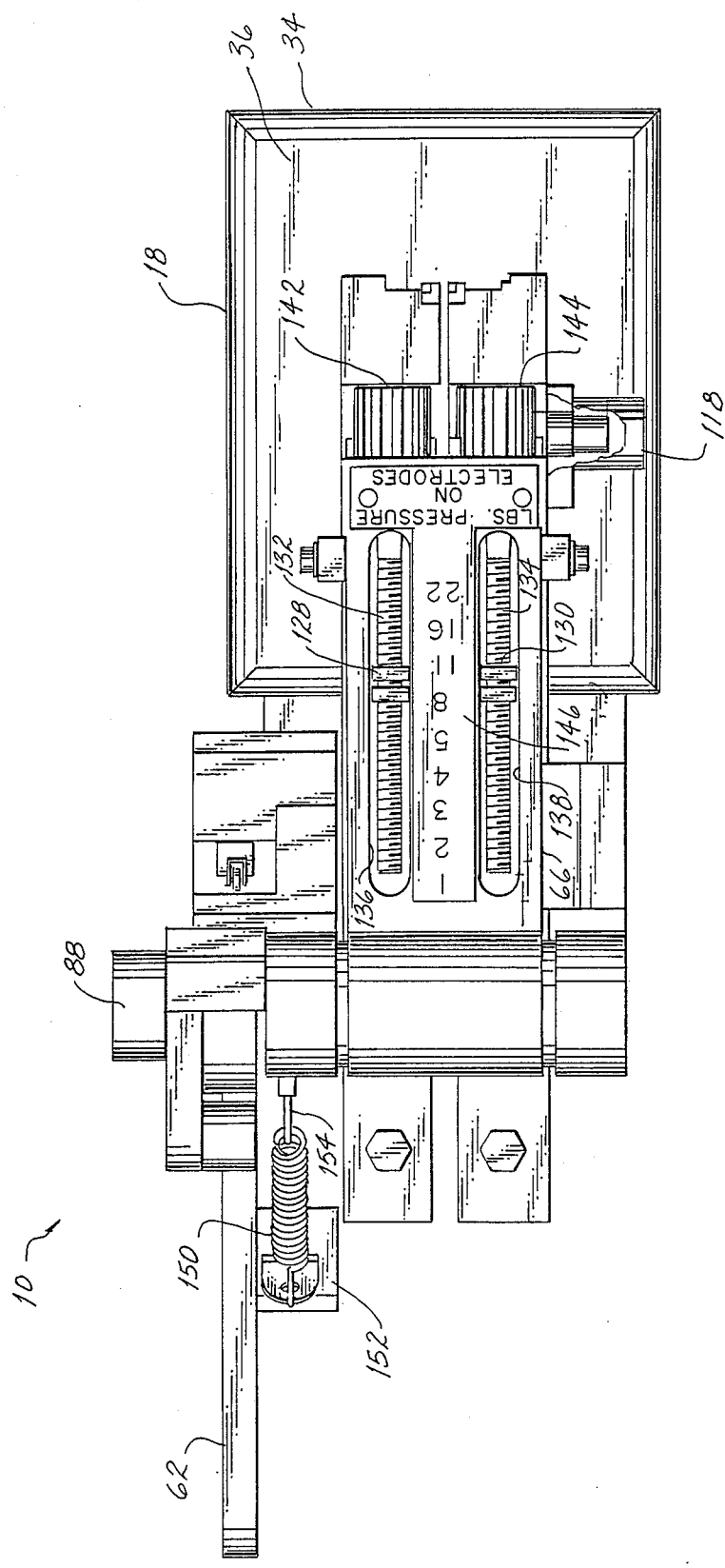
FIG. 9 is a top elevational view of the parallel gap welder shown in the prior Figures.

Contacting an intermediate portion of each leaf spring 122 and 124 is an adjustment finger 128 and 130. Each adjustment finger is provided with a central, threaded aperture received on a threaded shaft 132 and 134 extending along the length of the upper support. The front and rear ends of the shafts are each rotatably received adjacent to the front and rear ends of the upper support. The upper ends of the fingers 128 and 130 ride in slots 136 and 138 formed in the upper support to preclude rotation of the fingers when the shaft is rotated to axially shift the fingers. Each threaded shaft has at its front end, forwardly of the upper support, a tension adjustment knob 142 and 144, rotatable by an operator, for the purpose of adjusting the position of the fingers and the pressure desired to be applied by each electrode to the workpiece as a function of the workpiece. A scale 146 indicates the location of each finger and, consequently, the pressure which will be applied by each electrode to the workpiece components. When, for example, either adjustment finger is moved to the front of the welder machine, to the left as shown in FIGS. 1 and 9, by the rotation of the knob and shaft, the tension applied by the leaf springs 122 and 124 to the electrode will be to a lesser degree. When, however, either adjustment finger is moved oppositely, by opposite rotation of the associated knobs, a greater pressure will be applied by the leaf springs to the lower support as a result of the operator depressing the handle.

In the disclosed embodiment, these pressures may vary from one pound to twenty-two pounds depending upon where the adjustment fingers are located on the springs. When, for example, a finger contacts a spring in close proximity to its associated electrode, the pressure of the finger on the spring will be vertically direct with negligible flexing of the spring. When, however, the finger contacts the other or rear end of the spring, the spring will flex greatly and minimize the force of its electrode on the contacted workpiece segment. Note FIG. 9 for a scale 146 to assist the operator in the locating of the adjustment finger and, consequently, the pressure to be applied to the workpiece. As can be understood, adjustment of the tension is applied through the tension adjustment knob 142 and 144 with further fine adjustment being provided by the adjustment bolts 126 extending upwardly from the individual lower horizontal supports to support the springs.

As can be understood, the downward movement of the handle 62 by an operator will initially cause the roller 78 of the follower arm 70 to ride against the primary or first portion 90 of the cam surface 80. This will rotate the upper shaft 64 as the roller 78 moves radially outwardly away from the axis of the lower shaft 84. The upper shaft 64 will rotate since it is coupled to the follower arm 70 which, in turn, by virtue of the coupling to the upper horizontal shaft 64, will rotate the upper support 66 downwardly. This allows the bracket arms 104 and 106 to be driven downwardly, and the lower supports 100 and 102 to fall under the influence of gravity, until the separate electrodes 24 and 26 have their motion abated by their contact with the workpiece 14. FIGS. 2 through 6, particularly FIG. 6, most clearly illustrates the lower surface of the lower supports 100 and 102 located above the supporting shoulder or ledge 112. Further movement of the handle 62 downwardly will cause the follower arm 70 and its roller 78 to be contacted by the third portion 94 of the cam to contact the finger 60 and energize the power supply 96 to effect the welding of the workpiece 14. Pressure applied by each electrode 24 and 26 to the workpiece 14 is independently adjusted and controlled by the tension control subassembly 28 as discussed above prior to activation of the welder machine.

Insulation plates 148 formed in the lower surface of the lower supports 100 and 102 preclude contact of the electrically conductive lower supports with brackets 104. Additionally, the lower shaft has an insulating sleeve as well as insulating washers for contacting the lower supports at their region of coupling. These insulating components electrically isolate the lower support arms and the electrodes 24 and 26 from the remainder of the machine.

Movement of the handle 62 downwardly is restrained by a handle coil spring 150 coupling a bracket 152 on the handle 62 with an eyelet extending from the right vertical support. This handle coil 150 spring also functions to return the handle 62 to the upper or raised ready position after the performance of a welding cycle. Similarly, a lower or second coil spring 156 is located between the left vertical support arm 48 and a cylindrical recess in a spring support 158 depending from the upper support 66. This second spring also resists the motion effected by the handle 62 and returns the control assembly 22, including the electrodes 24 and 26 to their upper or raised ready position when the activating force is removed as by the operator. Such action also removes contact between the cam surface 80 and switch finger 60 to terminate the current flow and heating of the electrodes.

The present disclosure includes that contained in the appended claims as well as that of the foregoing description. Although this invention has been described in its preferred form with a certain degree of particularity, it is understood that the present disclosure of the preferred embodiment has been made by way of example only and that numerous changes in the details of construction and the combination and arrangement of parts may be resorted to without departing from the spirit and scope of the invention.

Now that the invention has been described, what is claimed is:

1. A welder comprising:
   a base means having a surface to support a workpiece in a predetermined position;
   vertical support means extending from the rear end of the base means;
   a first shaft means journaled for rotation in the vertical support mean;
   a first support means mounted on the first shaft means between the vertical support means for movement in an arcuate path of travel;
   follower arm means secured to one end of the first shaft means;
   second shaft means secured between the vertical support means;
   handle means mounted for rotation on the second shaft means, the handle means being provided with rotatable cam means to rotate the follower arm means, first shaft means and first support means in response to movement of the handle means;
   second support means secured at their rear ends to the second shaft means for movement in an arcuate path of travel;
   electrode means secured to the front ends of the second support means for movement in an arcuate path of travel;
   bracket arm means secured to the edges of the first support means to provide shoulders for supporting the second support means and limit their downward motion;
   leaf spring means secured at their rear ends to the first support means;
   finger means mounted for longitudinal movement with respect to the first support means with their lower edges adapted to contact predetermined portions of the leaf spring means for varying the tensions to be applied to the workpiece by the electrode means; and
   electrical means responsive to motion of the handle means to energize the electrode means after they have contacted the workpiece.

2. The welder as set forth in claim 1 and further including spring means to resist movement of the handle means and to return the moved handle means to its initial rest position.

3. The welder as set forth in claim 1 and further including an elevation block to raise the workpiece and an elevation spacer to raise the vertical support means.

4. Control means for a parallel gap welder of the type having a base; a plate to support a workpiece in a predetermined position with respect to the base; vertical supports extending upwardly from the rear end of the base; an upper shaft journaled for rotation in the vertical supports; a generally horizontal upper support mounted on the upper shaft for rotational movement therebetween; a follower arm secured to one end of the upper shaft for rotating the upper shaft and upper support; a lower shaft secured between the vertical supports beneath the upper shaft and a handle mounted for rotation on the lower shaft, the handle being provided with a cam surface to rotate the follower arm, upper shaft and upper support in response to movement of the handle, the control means including;
   a pair of laterally spaced horizontal lower supports secured at their rear ends to the lower shaft for independent rotation thereabout;
   electrodes secured to front ends of the lower supports for movement into and out of engagement with the workpiece in response to the movement of the handle;
   vertical bracket arms secured to the edges of the upper support and depending downwardly therefrom to present ledges for supporting the lower supports and for limiting the arcuate downward motion of each lower horizontal support;
   a pair of laterally spaced leaf springs rigidly secured at their rear ends to the upper support and, having their front ends supported by the lower supports;
   adjustment means mounted for longitudinal movement with respect to the upper support between the front and rear ends of the leaf springs with their lower edges adapted to contact and predetermined portions of the leaf springs for varying the tensions to be applied by the electrodes to the workpiece; and
   switch means not responsive to initial motion of the handle but responsive to further continued motion of the handle to initiate the flow of current through said electrodes and the workpiece only after the electrodes have been positioned on the workpiece and responsive to initial disengagement motion of said handle to interrupt the flow of current through said electrodes and the workpiece.

5. An improved parallel gap welder comprising:
   a base;
   a table top plate to support a workpiece in a predetermined position with respect to the base;
   spaced vertical supports extending upwardly from the rear end of the base;
   an upper shaft journaled for rotation about a first axis in the vertical supports adjacent to their upper ends;
   a generally horizontal upper support mounted on the upper shaft between the vertical supports for rotational movement therebetween;

a follower arm secured to one end of the upper shaft for rotating the upper shaft and upper support;

a lower shaft secured between the vertical supports beneath the upper shaft for rotation about a second axis;

a handle mounted for rotation on the lower shaft, the handle being provided with a rotatable cam surface to rotate the follower arm, upper shaft and upper support in response to movement of the handle;

a pair of laterally spaced horizontal lower supports secured at their rear ends to the lower shaft for independent rotation thereabout;

electrodes secured to front ends of the lower supports, said electrodes having an arcuate path of travel;

vertical bracket arms secured to the edges of the upper support and depending downwardly therefrom to present shoulders for supporting the lower supports and limit to the downward motion of each lower horizontal support;

a pair of laterally spaced leaf springs, each secured rigidly at its rear end to the upper support and, having its front end supported on an adjustment nut upstanding from a lower support;

adjustment fingers, each mounted for longitudinal movement with respect to the upper support between the front and rear ends of each leaf spring with their lower edges adapted to contact a predetermined portion of a leaf spring for individually varying the tensions to be applied by the electrodes to the workpiece; and electrical means responsive to continued motion of the handle to energize the leaf springs after they have contacted the workpiece segments to be welded.

* * * * *